Patented Sept. 20, 1932

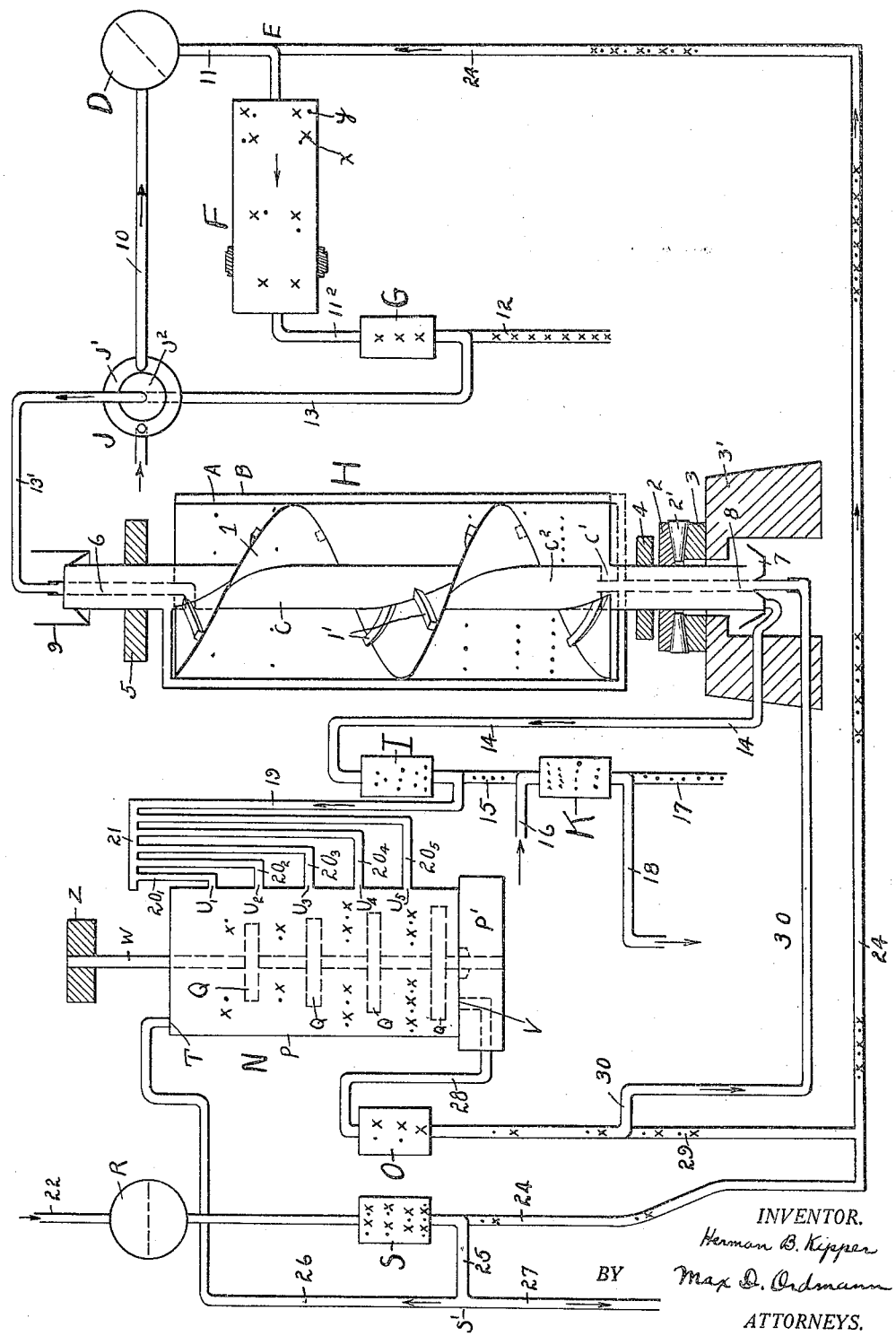

1,878,586

UNITED STATES PATENT OFFICE

HERMAN B. KIPPER, OF NEW YORK, N. Y.

PROCESS OF RECOVERING SODIUM, POTASSIUM AND MAGNESIUM CHLORIDES FROM NATURAL BRINES AND CONTROLLING THE CRYSTAL SIZES

Application filed January 30, 1930. Serial No. 424,482.

The present invention relates to a method of separating the chlorides of sodium, potassium and magnesium from brines such as those obtained from the Great Salt Lake Desert and which contain principally the above named chlorides in solution in percentages of about 1.25% of the latter two salts and 18% for the sodium salt.

I am fully conversant with the methods employed in securing potassium and magnesium chlorides from the Strassfurth deposits and also the many methods hitherto used and devised for the recovery of these salts from Utah salt brines. These methods are however, stated simply, inefficient.

In my copending application Ser. No. 375,908 of July 5, 1929, I have described a process for the recovery and separation of the chlorides of sodium, potassium and magnesium from natural brines in a manner which eliminates the aforementioned drawbacks. My experimental work bearing on the processing as described in my said earlier application has shown it to be highly efficient and practical, the one exception to such statement being due to the fact that the crystals formed in the apparatus described are very small. As for many practical uses larger crystals are desirable, and in order to obviate the difficulty noted, the present improved method and special types of apparatus presenting certain novel mechanical features have been further developed.

The present invention therefore has for its primary object a method of processing wherein the crystals size of the salts extracted may be determined.

As before, the process is based on the counter current heating principle. At one end of the apparatus employed for carrying out my new process the liquid or brine used is heated practically to the boiling point or just below such temperature, and at the other end thereof artificial cooling is used whereby the brine temperature is reduced to about 0° C. The liquors or brines in a counter current fashion are made to gradually give off their heat or to cool one another down as required, by either direct or indirect action on one another.

By this process the separation of the salts of the brines is accomplished in a highly efficient manner.

A brief description of the process for the separation of the sodium, potassium and magnesium chloride from one another when contained in the same solution or brine follows. The present description applies more particularly to a brine of nature of Utah salt brine or at least to a brine of this concentration. However, the methods are of course, of general application.

As potassium and magnesium chlorides are the two valuable constituents of the Utah brines and as these are not in a saturated condition in the said brine, the latter is first evaporated by "solar evaporation," i. e. by use of the heat from the sun and by use of the winds etc., up to a point where it becomes saturated with potassium chloride.

In order to render the ground employed for "solar evaporation" more impervious, I first treat the same with an alkali or alkaline solution, as ammonium hydroxide, lime water, sodium hydroxide, sodium carbonate, etc. In this manner, part of the magnesium chloride with which the ground is largely saturated is converted to a magnesium hydroxide or other basic magnesium salt. This forms magnesium cementitious materials, as the well known magnesium oxy-chloride cement. The ground is thereby rendered very nonporous or impervious to water or to the brines in question.

During this primary evaporation eighty to ninety per cent of the sodium chloride or common salt, are precipitated out and about the same percentage of water is evaporated or eliminated from the process. The "brine" then contains about 120 to 130 grams per liter of potassium chloride and about the same percentage of magnesium chloride. It is then pumped to the refinery operation in which operation the separation of these salts in question is brought about.

My process will be more fully understood by reference to the acompanying drawing which forms part of this specification and in which similar reference characters denote corresponding parts:—

In the drawing the figure is a diagrammatic sketch of the apparatus and system in which the refining operations are carried out. The right hand end in said figure represents the hot end of the apparatus and the left hand end, the cold end. In said figure the crystallizer H and cold precipitator N are shown in partial sectional elevation.

The apparatus comprises an indirect heater D, such as a steam heater or the like, a rotary or any other suitable type of hot dissolver F, centrifugal or other types of filters G, I, K, O and S, the crystallizer H shown specifically in the figure, a cold precipitator N shown specifically in the figure, a refrigerating plant (not shown) and a cooler R.

Except for the parts of apparatus H and N the balance of the apparatus are of any conventional construction and design and are shown in their relative relationship to one another. However, the representations are not indicative of the size of the apparatus.

In particular however, the crystallizer H may comprise a rotatable cylinder which may be mounted either vertically, horizontally or other angle of inclination. In its interior, crystallization is produced. The cylinder may be externally cooled by water jacketing or by sprays or otherwise or water cooled pipe may be run lengthwise through it. Further the cylinder may have in it a worm guide, a screw or helix of metal running parallel to the cylinder periphery and throughout its length or a part thereof. The latter modification is shown in the figure for operation in vertical position, in which position the greatest advantages of operation are secured. In this modification A represents a rotatable cylinder having a water jacket B and an interior cooling pipe C which also serves as the driving shaft for said cylinder A. Mounted to the exterior of said pipe C in said cylinder is the interior controlling helix 1.

The lower end of the pipe C may be used to carry a bearing plate 2 suitably supported by means of roller or ball bearings 2′ carried by a base plate 3 which is mounted on foundation 3′. The shaft C and consequently cylinder A may be driven through pulley 4 attached to said shaft and driven through belting or the like (not shown). The upper end of the shaft C is suitably journaled through a bearing or guide 5, so arranged as to establish the vertical condition of the cylinder A. C at its lower and upper ends is provided with suitable inlet and outlet means for the brine to cylinder A and cooling water for jacket B and pipe C. The pipe 13 connects to the brine inlet to the cylinder A through a stuffing box connection to inlet pipe 6. The said brine flows out through a portion C′ of pipe C at its lower end which is closed off from the balance of pipe C and flows out into a trough 7 from which it is led off for use as will be presently described. Cooling liquid is supplied to the jacket B and the portion $C^2$ of pipe C from pipe 30 through a stuffing box to pipe 8, which supplies both said jacket and said portion $C^2$ of pipe C, and is led out through the top of pipe C into a trough or vat 9 which leads to an evaporator to be presently described. If desired any other suitable means of connection of the inlets and outlets may be employed. Further to increase the efficiency of action of the helix, baffles 1′ as angles or bars are welded or otherwise suitably fastened to the worm or helix 1 transversely to its axis of rotation and at suitable intervals.

In actual operation of the precipitator, if the cylinder A is revolved in such a direction as to produce downward flow of the brine by means of the helix or worm, the brine will of course flow downward at a very much enhanced speed. Such speed, it will readily be perceived would be very much greater than the speed of flow if the cylinder were standing still when gravity alone would act. If on the other hand the rotary cylinder is revolved in such a direction as to cause upward flow by means of the helix or screw, it will of course operate against the natural or gravitational flow and retard the same. In this manner by variation of the cylinder speed and/or direction of rotation thereof great flexibility in the speed of flow and hence equivalent flexibility of the cooling effect on the contents of the cylinder by the flow of cooling liquid in the cooling jacket B and pipe C may be obtained. It will further be readily understood that by proper rotation of the cylinder the worm tends to carry the liquor or brine contents of the cylinder upward and centrifugal force produced by the rotary motion of the cylinder A tends to force travel of the said contents along the interior cooled walls of the rotary cylinder so that very excellent cooling effects are produced. These moreover as already noted may be altered at will. In this manner rapidity of cooling and hence crystal sizes are readily determined.

The "solar concentrated brine" enters the separate outer jacket J′ of a preheater J which heats said brine by means of the flow through the inner chamber $J^2$ of heated brine coming from another part of the process. The solar concentrated brine is then passed through pipe 10 into the indirect heater D in which it is heated to about 100° C. and then flows from said heater through a pipe 11 to a point E where it meets a mixture of sodium and potassium chloride crystals secured subsequently in the process, as will be presently described, and suitably conveyed to said point. From E the hot brine together with the mixed crystals is lead through pipe 11′ to the dissolver F which may be in the form of a rotating drum suitably driven and which agitates the mixture. In this part of the apparatus the potassium chloride is dissolved and the sodium chloride remains in crystal form. This is due to the fact that the brine dissolves nearly 300 grams of potassium chloride at 100° C. per 1000 grams of water contained in the brine, whereas at 25° C. only 120 grams of potassium chloride are soluble in it. With sodium chloride the solubilities are 195 grams at 25° C. and 170 grams at 100° C. per 1000 grams of water. The solubility of the sodium chloride it will therefore be seen, is reversed at the two respective temperatures or in other words, sodium chloride is more soluble at 25° C. than 100° C. in this brine so that a small amount of the latter salt actually precipitates out under the higher temperature. The relative precipitation is shown diagrammatically in the drawing wherein the potassium chloride crystals are represented by small dots Y and the sodium chloride crystals by small crosses X. It will be seen that at the right hand end of the dissolver both crystals X and Y are present whereas as the flow progresses towards the left hand end, the potassium chloride crystals Y diminish in quantity.

From the dissolver F, the precipitated sodium chloride crystals and brine solution still hot are passed through pipe 11² to the filter G, which may be a centrifugal filter and in which separation of said crystals from the brine solution occurs. The said crystals of sodium chloride may be led to storage from said filter by any suitable conveyor 12. The brine is led by pipe 13 from the filter G to chamber J² of heater J and then to the interior compartment of the crystallizer H, i. e., to cylinder A by pipe 13'. The brine solution is carried through said cylinder and its speed of flow regulated by the direction of rotation of said cylinder and worm 1 as above described. As the solution flows through said cylinder A it is cooled by means of cooling liquid coming from the cold end and flowing through pipe C and jacket B. This cooling causes the potassium chloride crystals to precipitate out and their size depends on the rate of cooling which is controlled as described.

During the cooling process from 100° C. to let us say 5° C., the solubility of the potassium chloride in the brine has been reduced from practically 300 grams of potassium chloride per 1000 grams of water contained in the brine to 70 grams. A precipitation of patassium chloride crystals has therefore taken place in keeping with these figures. The progressive increase in precipitation is indicated by the increasing number of crystals Y from top to bottom in said precipitator.

The brine or suspension while still cold is now led to filter I, which is of the same type as filter G, from trough 7 by pipe 14 and the potassium chloride crystals Y are then passed by suitable conveyor 15 to the washer K which may be a similar type of filter as filter G. In said washer said crystals are washed and freed of adhering brine by cold water led to said filter through pipe 16, and then said crystals are led by means of a suitable conveyor 17 to storage. The cold wash water leaving filter K by pipe 18 is led to a suitable vacuum or solar evaporator (not shown) for the recovery of the salts in the said wash water, which are subsequently used commingled with the other brines.

From the filter I the brine freed from potassium chloride crystals Y is passed to the cold precipitator N.

The precipitator N in the present embodiment of my invention is also of special design in order to control crystal size. In the original process as described it was found that the mixed crystals obtained from the corresponding precipitator were very small. In order to obviate this difficulty the apparatus as outlined in the figure is employed.

In this apparatus P is a cylinder or other vessel mounted on a base P' and located therein is a stirrer of any type and shown in the present embodiment as a rotatable paddle wheel arrangement Q mounted on a shaft W and adapted to be suitably driven from a belt (not shown) by means of pulley Z. T is an inlet in the top or upper portion of the cylinder P into which super cooled highly concentrated magnesium chloride brine is admitted. Suitably arranged in the side walls of said cylinder are a plurality of openings $U_1$, $U_2$, $U_3$, $U_4$ and $U_5$ each at a different level in said cylinder. Leading from said openings are a plurality of pipes $20_1$ $20_2$, $20_3$ $20_4$ and $20_5$ respectively all of the latter terminating in a common pipe joint 21 to which said pipe 19 coming from filter I is connected.

The sodium, potassium chloride brine coming from pipe 19 enters the cylinder P through the openings $U_1$, $U_2$ etc., through each opening an equal portion or percentage of said brine being led into the apparatus, where it meets super cooled highly concentrated magnesium chloride brine. In this manner comingling of the two brines is relatively only very slowly produced. Such gradual or slow comingling of the brines effects correspondingly slow crystallization, or speeds of crystallization of the potassium chloride and sodium chloride. As the size of the salt crystals precipitated is dependent upon the speeds of crystallization, with very much reduced or slow speed of crystallization, crystal growth is correspondingly reduced in speed, and increased size of crystals (potassium chloride and sodium chloride mixture) is obtained. The comingled brines together with their crystal precipitates are withdrawn from cylinder P at V.

The super cooled magnesium chloride brine which is admitted to cylinder P through opening T is obtained as follows:—

The said magnesium chloride brine comes from a magnesium chloride reservoir (not shown) flows through pipe 22 to cooler R connected with refrigeration apparatus (not shown) where it is cooled to about 0° C. The said magnesium chloride brine has a high percentage of magnesium chloride, about 500 grams of magnesium chloride per 1000 grams of water, and also contains small percentages of potassium and sodium chloride. From the cooler R the cold magnesium chloride brine is led by pipe 23 to a rotary filter S and through the latter where sodium and potassium crystals X and Y which have precipitated out of the magnesium chloride solution through cooling are removed and fed to a conveyor 24 of any suitable type which conveys said mixed crystals to the point E for mixture with the brine entering the hot dissolver F. The cold brine solution emerging from filter S is led through pipe 25 to the point S′ where it divides into two parts, one part being led by pipe 26 to point T, the magnesium chloride inlet to tank P. The second part is led off through pipe 27 to final evaporation whereby magnesium chloride crystals are obtained.

The cold magnesium chloride brine, which is led by pipe 26 to tank P has a concentration of 500 grams of magnesium chloride per 1000 grams of water and therein meets the brine coming from filter I and entering said tank P through openings $U_1$, $U_2$ etc. The comingled brines now contain somewhat over 300 grams of magnesium chloride per 1000 grams of water, at the low temperature of operation 0° C. to 10° C. The solubilities of both the sodium and potassium chlorides are now very low, about 30 to 40 grams per 1000 grams of water for both these salts, and therefore, both the latter salts precipitate out in said precipitator N, the crystal growth being controlled as indicated above. The precipitation from top to bottom is indicated by the dots and crosses Y and X respectively.

From said precipitator N, the solution and precipitation are by pipe 28 passed to filter O wherein the sodium and potassium crystals are removed and fed to said conveyor 24 by a conveyor 29. The cold brine leaving said filter O is led through pipe 30 to pipe 8 the cooling inlet of precipitator H. From pipe 8 it divides part flowing through cooling jacket B and part through $C^2$ of pipe C. The said cooling liquid flows out through the upper end of pipe C into vat 9 and from there is led off for further evaporation to again increase its concentration to 500 grams of magnesium chloride per 100 grams of water and is then returned to the operation and cooled in cooler R and then the final percentages of sodium chloride and potassium chloride precipitated out.

If a greater amount of "solar" evaporated brine than that required for the preparation of the potassium chloride is on hand, this may be passed directly to the "cold precipitator" N instead of being utilized completely in the hot dissolver.

During the winter months the natural cold brine might of course be used for cooling purposes in place of the cooling artificially produced by mechanical refrigeration apparatus.

The marked advantages of the processing are dependent on the use of artificial super-cooling together with concentrated brine, for "salting out" at one end of the apparatus and the use of hot brines at the other end for dissolving potassium chloride, and the gradual bringing of these brines together in such a manner that the energy utilized in heating the brines and that utilized in cooling the same so neutralize each other as to bring about efficient crystallization of the potassium chloride in the intermediate step of the process. In addition the control methods and apparatus used in the processing serve to increase the utility of the process by enabling a proper determination of crystal size of the products. In other words, efficient solution has been established at the "hot end" and efficient "salting out" at the "cold end," and efficient controlled crystallization in the intermediary steps. This affords very compact processing with consequent diminution of cost below the cost of the present processes.

It will be distinctly understood that artificial mechanical refrigeration produced by compression and expansion of gases is used in carrying out this processing.

In order to clearly define my refrigeration apparatus it might be better to describe the same as refrigeration obtained from the mechanical compression and expansion of gases, vapors or liquids.

My process may be varied without departing from its spirit and I do not wish to be limited to the details shown and described. For instance crystallizer H might be used merely as a hollow cylinder without any controlling worm or helix or it might be internally equipped with baffle plates and openings therein dividing it into compartments mounted as a Solvay column. Again cold precipitator N might be a rotatable cylinder horizontally mounted into which the sodium potassium brine might be led by suitable pipes having openings at various intervals, also the feeds of the magnesium chloride brine and the potassium sodium chloride brine comingled in this apparatus might be reversed. Furthermore it will be understood that the temperatures and concentrations mentioned represent only approximations and that these might be varied within considerable limits without destroying the nature or value of the processing described.

What I claim is:—

1. The recovery of sodium, potassium and magnesium chlorides from natural brines containing said salts in aqueous solution and having a high percentage of sodium chloride, comprising the step of first evaporating said brine by solar heat to a point where the brine becomes saturated with potassium chloride and the greater percentage of sodium chloride has been precipitated out and the greater percentage of water evaporated, then the step of heating the solar concentrated brine, saturated as to potassium chloride as normal atmospheric temperature for solution of an increased percentage of potassium chloride, soluble at a higher temperature, from a mixture of sodium chloride and potassium chloride subsequently obtained in the process, then the step of filtering off the undissolved sodium chloride crystals, then the steps of artificially cooling the brine residue by refrigerating means secured from the compression and expansion of fluids at a controlled rate to determine the crystal size of the precipitated potassium chloride crystals, then the step of filtering off said potassium chloride crystals, then the step of mixing the residual brine at a controlled, fractional rate with a brine subsequently obtained in the process artificially cooled by mechanical refrigeration secured from the compression and expansion of fluids, and containing a high percentage of magnesium chloride, then the step of filtering off the sodium chloride and potassium chloride crystals precipitated from said treatment, then recuperating the comingled residual brine to a high percentage of magnesium chloride containing brine, then artificially cooling, by refrigeration apparatus using the compression and expansion of fluids for production of cold, the recuperated brine for precipitating the residual sodium and potassium chloride crystals therein contained, then filtering off the latter salt crystal mixture and securing by further evaporation of the residual brine magnesium chloride crystals.

2. The recovery of sodium, potassium and magnesium chlorides from natural brines containing these salts in aqueous solution, comprising the steps of first precipitating the greater percentage of sodium chloride and increasing the concentration of potassium chloride to saturation at normal atmospheric temperature, then heating said concentrated potassium chloride for solution of an increased percentage of potassium chloride from a mixture of potassium chloride and sodium chloride subsequently obtained in the process, then filtering off the undissolved sodium chloride, then artificially cooling by mechanical refrigeration secured by the compression and expansion of fluids, the brine residue at a controlled rate to determine the crystal size of the precipitated potassium chloride crystals, then mixing the residual brine at a controlled, fractional rate with cooled brine containing a high percentage of magnesium chloride, then filtering off the sodium chloride and postassium chloride crystals precipitated from said treatment, then recuperating the residual brine to a high percentage of magnesium chloride brine by mechanical refrigeration secured by the compression and expansion of fluids, then cooling the latter brine for precipitating the residual potassium chloride and sodium chloride crystals therein contained and then after removing said crystals, precipitating the magnesium chloride crystals from said brine.

3. The recovery of sodium, potassium and magnesium chlorides from natural brines containing said salts in aqueous solution including the step of heating said brine to dissolve said potassium chloride and precipitate sodium chloride crystals, removing the latter, then artificially cooling the brine residue at a controlled rate to determine the crystal size of the resulting precipitated potassium chloride crystals, removing the latter from the residual brine and then mixing the residual brine at a controlled, fractional rate with artificially cooled brine containing a high percentage of magnesium chloride to precipitate sodium chloride and potassium chloride crystals of determined crystal size.

4. The recovery of sodium, potassium and magnesium chlorides from natural brines containing these salts in aqueous solution and having a high percentage of sodium chloride, comprising the step of first evaporating said brine to a point where the latter becomes saturated with potassium chloride and the greater percentage of sodium chloride has precipitated out and the greater percentage of water evaporated, then the step of heating said brine for solution of an increased percentage of potassium chloride from the addition of a mixture of sodium chloride and potassium chloride, then the step of removing the undissolved sodium chloride crystals, then the step of artificially cooling the brine residue at a controlled rate to determine the size of the precipitated potassium chloride crystals, then removing said latter crystals, then mixing the residual brine at a fractional rate with cooled brine containing a high percentage of magnesium chloride and then removing the sodium chloride and potassium chloride crystals precipitated from said treatment.

In testimony whereof I affix my signature.

HERMAN B. KIPPER.